United States Patent [19]

Lhospice

[11] Patent Number: 5,076,681

[45] Date of Patent: Dec. 31, 1991

[54] EYEGLASS FRAME TEMPLE AND EYEGLASS FRAME COMPRISING SAME

[75] Inventor: Bernard Lhospice, Blois, France

[73] Assignee: Essilor International Compagnie Generale d'Optique, Creteil, France

[21] Appl. No.: 482,753

[22] Filed: Feb. 21, 1990

[30] Foreign Application Priority Data

Feb. 28, 1989 [FR] France ................ 89 02590

[51] Int. Cl.⁵ .................... G02C 5/20; G02C 5/14
[52] U.S. Cl. .................................. 351/115; 351/123
[58] Field of Search ............ 351/111, 114, 115, 117, 351/123, 147, 149; 2/448, 449, 450

[56] References Cited

U.S. PATENT DOCUMENTS 4,750,828  6/1988  Sartor ............................ 351/115
4,787,728  11/1988  Anger ............................ 351/118

FOREIGN PATENT DOCUMENTS 0274563  7/1988  European Pat. Off. .
542595  1/1932  Fed. Rep. of Germany .
1335949  6/1963  France .
WO80/01844  9/1980  PCT Int'l Appl. .
1378683  12/1974  United Kingdom .

Primary Examiner—Rodney B. Bovernick
Attorney, Agent, or Firm—Charles A. Brown

[57] ABSTRACT

An eyeglass frame particularly suited to sporting activities has two temples each comprising a main part and an end part aligned with the main part. The end part is mounted at one end of the main part and adapted to rotate about its own axis relative to the main part. The end part has two opposite edges on respective sides of its rotation axis. One edge has a more accentuated curvature than the other.

16 Claims, 1 Drawing Sheet

EYEGLASS FRAME TEMPLE AND EYEGLASS FRAME COMPRISING SAME

BACKGROUND OF THE INVENTION

1. Field of the Invention

The invention concerns an eyeglass frame temple and more particularly an improvement enabling the user to adapt the general shape of the temple to suit his activity, in particular to secure the frame better during sporting activities.

2. Description of the Prior Art

An ordinary eyeglass frame temple usually ends with a relatively large radius curve adapted to rest on the upper part of the ear without discomfort to the user. For some activities, however, such as sporting activities, for example, it is desirable to secure the eyeglasses more firmly. One proposal is to join the ends of the two temples by an elastic cord passing around the back of the head. Another proposal is for temples with elastic end parts having an accentuated curvature, so that they fit more closely behind the ears. Frames of this kind are of relatively poor appearance and are tolerated only for a limited time and for carrying out specific physical activities. Usually the user must have two pairs of eyeglasses. The invention makes it possible to avoid this disadvantage.

SUMMARY OF THE INVENTION

In one aspect, the invention consists in an eyeglass frame temple comprising a main part and an end part aligned with the main part, mounted at one end of the main part and adapted to rotate about one axis thereof relative to the main part, the end part having two opposite edges on respective sides of its rotation axis of which one has a more accentuated curvature than the other.

In a first embodiment the main part comprises a longitudinal metal armature which extends into the end part which is rotatable on it. The end of the armature is widened to define a retaining shoulder and so prevent axial sliding of the end part relative to the main part.

In a preferred embodiment the part of the armature inserted into the end part is provided with a plurality of small retaining shoulders to facilitate assembly.

In another aspect, the invention consists in an eyeglass frame comprising two temples as hereinabove defined.

The invention will be better understood and other advantages of the invention will emerge more clearly from the following description of an eyeglass frame temple in accordance with the invention given by way of example only and with reference to the appended drawings.

DETAILED DESCRIPTION OF THE INVENTION

Figure 1:
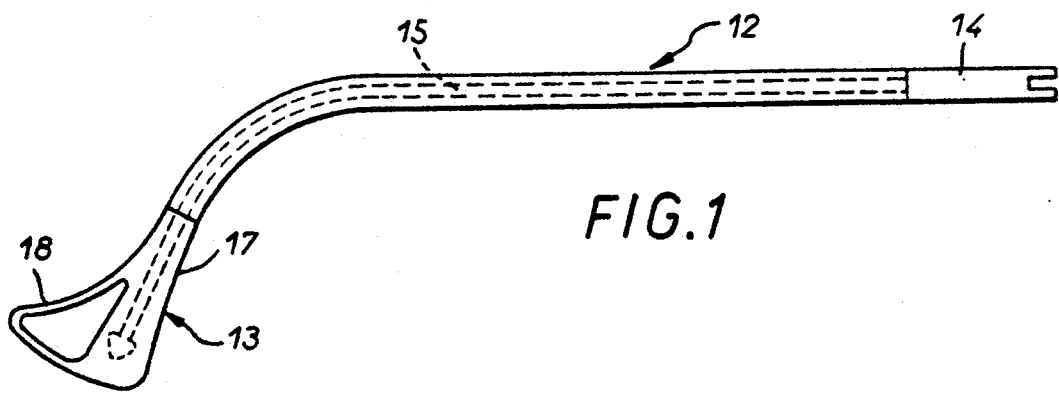
FIG. 1 shows an eyeglass frame temple in accordance with the invention.
Figure 2:
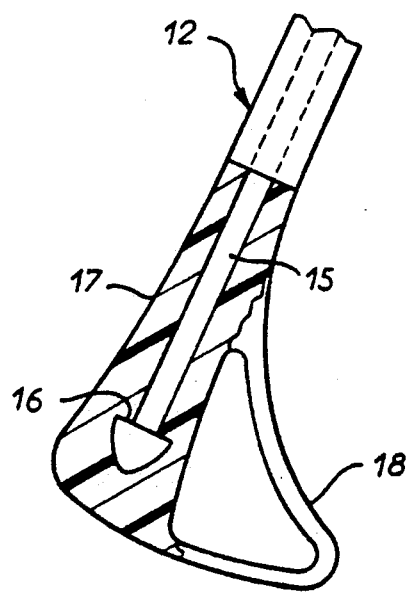
FIG. 2 is a partially cut away view in cross-section of the end part of the temple.
Figure 3:
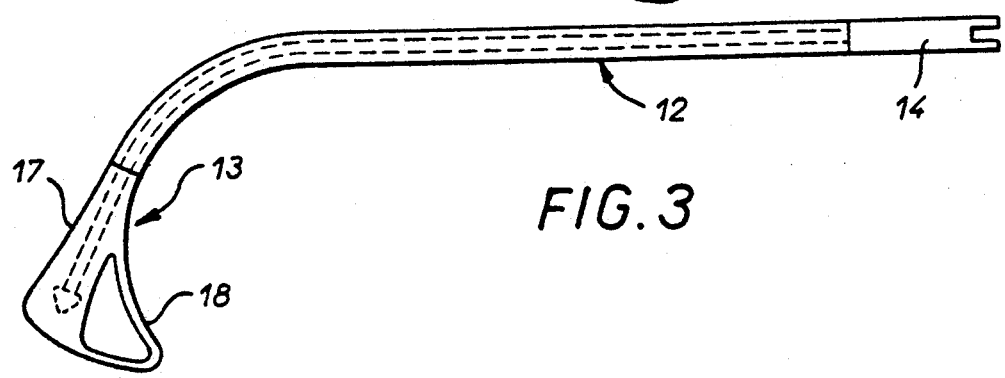
FIG. 3 shows the same temple in a configuration particularly suited to sporting activities.

The eyeglass frame temple shown in FIGS. 1 through 3 has two separate parts: a main part 12 and an end part 13. These two parts are aligned with each other. One end of the main part comprises, in the conventional way, a hinge member 14 forming part of the pivot whereby the temple is mounted to the remainder of the eyeglass frame (not shown). The main part is molded from plastics material around a metal armature 15. The end part 13 is mounted to rotate on itself at the end of the main part opposite the hinge member. To this end the longitudinal armature 15 is extended beyond the plastics material portion of the main part into the end of part 13. The armature is a circular cross-section metal rod and the end part rotates on it. The end part 13 and the part of the armature 15 inserted in it comprise coupling means adapted to prevent axial sliding of the end part 13 relative to the main part 12. To be more precise, the end of the armature 15 inside the end part 13 is widened. The shape of this widened end is adapted to prevent any relative axial movement of the two temple parts while enabling rotation of the end part 13.

As shown in FIG. 2, the widened end defines a retaining shoulder 16.

According to an important feature of the invention the end part 13 comprises two opposite edges 17 and 18 on respective opposite sides of its rotation axis as materialized by the end part of the armature 15. The edge 18 has a curvature that is significantly more accentuated than that of the edge 17.

Figure 4:
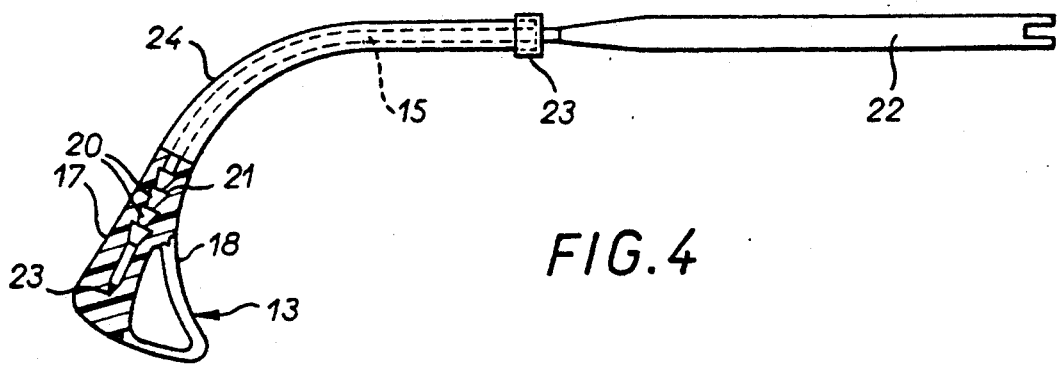
FIG. 4 shows an alternative embodiment.

In the preferred embodiment of FIG. 4 analogous parts which carry the same reference numbers will not be described again. In this embodiment the part of the armature 15 which is inserted in the end part 13 comprises a plurality of frustoconical sections 20 defining several small retaining shoulders 21. The end 23 of the armature is tapered to facilitate its insertion into said end part. This provision of a plurality of small shoulders 21 facilitates fitting the end part, which is simply force-fitted.

In the FIG. 4 embodiment the armature 15 forms, at the hinge member end, a metal temple 22 extended beyond a metal ring 23 by a cylindrical part extending into a plastics material sleeve 24 optionally covered with a flexible material such as silicone rubber.

When the user is not engaged in any significant physical activity he places the end parts 17 of his eyeglass frame in the position shown in FIG. 1. The overall curvature of the temple end is therefore relatively little accentuated and the frame temples rest essentially on the upper parts of the ears. On the other hand, if the user wishes to undertake a sporting activity he has only to turn each of the end parts through 180° to obtain the configuration shown in FIG. 3. Each temple of the frame then ends in a part having a relatively accentuated curvature (FIG. 3) forming a sort of hook adapted to bear against the lower part of the ear, approximately in the mastoid sinus.

I claim:

1. Eyeglass frame temple comprising a main part and an end part substantially shorter than and aligned with said main part, said end part being rotatably mounted at one end of said main part and being rotatable by 180 degrees about one axis thereof relative to said main part, said end part being provided with two opposite edges on respective sides of its rotation axis, the two opposite edges forming respective means to contact the ear, one of said two opposite edges being adapted for use in physical activity of the user and having a look-like curvature significantly more accentuated than the curvature of the other edge, and means being provided to prevent axial sliding of said end part relative to said main part while permitting rotation of the end part relative to the main part through the 180 degrees.

2. Temple according to claim 1 wherein said main part comprises a longitudinal metal armature which extends into said end part which is rotatable on it.

3. Temple according to claim 2, wherein said end part and the part of said armature inserted in said end part comprise said means to prevent said axial sliding.

4. Temple according to claim 3 wherein the end of said armature is widened.

5. Temple according to claim 4 wherein said widened end defines a retaining shoulder.

6. Temple according to claim 2 wherein the part of said armature inserted in said end part comprises a plurality of frustoconical sections or the like defining a plurality of small retaining shoulders.

7. Temple according to claim 6 wherein the end of the part of said armature inserted in said end part is tapered.

8. Temple according to claim 2 wherein said armature is made of metal.

9. Eyeglass frame comprising two eyeglass frame temples as recited in claim 1.

10. Frame according to claim 9 wherein said main part comprises a longitudinal metal armature which extends into said end part which is rotatable on it.

11. Frame according to claim 10 wherein said end part and the part of said armature inserted in said end part comprise said means to prevent said axial sliding.

12. Frame according to claim 11 wherein the end of said armature is widened.

13. Frame according to claim 12 wherein said widened end defines a retaining shoulder.

14. Frame according to claim 10 wherein the part of said armature inserted in said end part comprises a plurality of frustoconical sections or the like defining a plurality of small retaining shoulders.

15. Frame according to claim 14 wherein the end of the part of said armature inserted in said end part is tapered.

16. Frame according to claim 10 wherein said armature is made of metal.

* * * * *